United States Patent
Kazuno et al.

(10) Patent No.: US 11,798,322 B2
(45) Date of Patent: Oct. 24, 2023

(54) POWER SUPPLY DEVICE MANAGEMENT SYSTEM

(71) Applicant: HONDA MOTOR CO., LTD., Tokyo (JP)

(72) Inventors: Shuichi Kazuno, Saitama (JP); Yukiko Onoue, Saitama (JP); Tsubasa Uchida, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 354 days.

(21) Appl. No.: 17/180,873

(22) Filed: Feb. 22, 2021

(65) Prior Publication Data
US 2021/0264692 A1 Aug. 26, 2021

(30) Foreign Application Priority Data

Feb. 25, 2020 (JP) ................. 2020-029087

(51) Int. Cl.
*G07C 5/00* (2006.01)
*H04L 67/12* (2022.01)
*B60L 58/10* (2019.01)
*H01M 10/48* (2006.01)
*B60K 6/28* (2007.10)

(52) U.S. Cl.
CPC .............. *G07C 5/008* (2013.01); *B60L 58/10* (2019.02); *H01M 10/48* (2013.01); *H04L 67/12* (2013.01); *B60K 6/28* (2013.01); *B60Y 2200/91* (2013.01); *B60Y 2200/92* (2013.01)

(58) Field of Classification Search
CPC .................................................. G07C 5/008
See application file for complete search history.

(56) References Cited

U.S. PATENT DOCUMENTS

| 7,710,073 | B2* | 5/2010 | Yamauchi | H01M 10/48 320/132 |
|---|---|---|---|---|
| 10,013,678 | B2* | 7/2018 | Matsuyama | H01M 10/4207 |
| 11,014,468 | B2* | 5/2021 | Shiiyama | G06F 21/44 |
| 11,300,622 | B2* | 4/2022 | Uchida | G06Q 30/0278 |
| 11,527,110 | B2* | 12/2022 | Covington | G07C 5/0808 |
| 11,569,683 | B2* | 1/2023 | Binder | G06F 3/14 |
| 2007/0108946 | A1 | 5/2007 | Yamauchi et al. | |

(Continued)

FOREIGN PATENT DOCUMENTS

| JP | 2007141464 A | 6/2007 |
|---|---|---|
| JP | 2018161006 A | 10/2018 |

(Continued)

*Primary Examiner* — Michael A Berns
(74) *Attorney, Agent, or Firm* — CKC & Partners Co., LLC (57) ABSTRACT

Provided is a management system that can effectively manage a power supply device when the power supply device of an electric moving body is used for secondary use.

A power supply device management system 1 includes: an electric moving body 100 including power supply devices 110 and 111, a communication unit 120, and a control unit 130; and a server device 300, in which a first identification number is assigned to each module unit in the power supply devices 110 and 111, and the server device 300 includes a communication section 310 that can communicate with the communication unit 120, and a storage unit 320 that stores characteristic information and failure history of the power supply devices 110 and 111, together with the first identification number.

2 Claims, 4 Drawing Sheets

(56) References Cited

U.S. PATENT DOCUMENTS

| | | | |
|---|---|---|---|
| 2016/0162849 | A1 | 6/2016 | Matsuyama et al. |
| 2018/0351401 | A1 | 12/2018 | Binder et al. |
| 2020/0009984 | A1 | 1/2020 | Shiiyama et al. |
| 2021/0264692 | A1* | 8/2021 | Kazuno ................. G07C 5/008 |

FOREIGN PATENT DOCUMENTS

| | | |
|---|---|---|
| JP | 2019004690 A | 1/2019 |
| WO | 2015012144 A1 | 1/2015 |

* cited by examiner

POWER SUPPLY DEVICE MANAGEMENT SYSTEM

This application is based on and claims the benefit of priority from Japanese Patent Application No. 2020-029087, filed on 25 Feb. 2020, the content of which is incorporated herein by reference.

BACKGROUND OF THE INVENTION

Field of the Invention

The present invention relates to a power supply device management system.

Related Art

Conventionally, a system has been proposed for recycling a power supply device such as a used battery which was equipped to an electric vehicle or the like and used, and utilizing the recycled battery or the like for secondary use. For example, a battery secondary use management system has been proposed which predicts the end of use of a battery in use based on degradation estimation information of the battery in use, and determines in advance the secondary use destination of the battery (refer to PCT International Publication No. WO2015/012144).
Patent Document 1: PCT International Publication No. WO2015/012144

SUMMARY OF THE INVENTION

When the power supply device such as a battery is used for secondary use, in order to improve the measurement accuracy and deterioration prediction accuracy of the voltage characteristics and output characteristics of the power supply device, it is preferable to perform measurement by taking over the measurement history before the secondary use of the power supply device.
In addition, no management system has been proposed for preventing unexpected use of the power supply device in the secondary use destination.

The present invention has been made in view of the above, and an object thereof is to provide a management system that can effectively manage a power supply device when the power supply device of an electric moving body is used for secondary use.

According to the first aspect of the present invention, a power supply device management system includes: an electric moving body including a power supply device, a communication unit, and a control unit; and a server device, in which a first identification number is assigned to each system unit in the power supply device, and the server device includes a communication section that can communicate with the communication unit, and a storage unit that stores characteristic information and failure history of the power supply device, together with the first identification number.

According to the first aspect of the invention, it is possible to provide a management system that can effectively manage the power supply device when the power supply device of the electric moving body is used for secondary use.

According to the second aspect of the present invention, the power supply device management system according to the first aspect, in which, when the power supply device is used for secondary use, the storage unit takes over and stores the first identification number, the characteristic information and the failure history.

According to the second aspect of the invention, it is possible to provide a management system that can effectively manage the power supply device used in the secondary use destination by taking over the information that can be used when the power supply device of the electric moving body is used for secondary use.

According to the third aspect of the present invention, the power supply device management system according to the second aspect, in which the communication section is adapted to periodically acquire current position information of the power supply device, the storage unit stores registered position information when the power supply device is used for secondary use, and the server device includes a first comparison unit that compares the current position information with the registered position information.

According to the third aspect of the invention, since the registered position information and the current position information of the power supply device used for secondary use can be compared, unexpected use of the power supply device used for secondary use can be prevented.

According to the fourth aspect of the present invention, the power supply device management system according to the first aspect, further comprises an electric vehicle which is a secondary use destination of the power supply device, in which the electric vehicle includes at least one peripheral device to be used together with the power supply device, a second identification number is assigned to each of the peripheral devices, the storage unit stores the first identification number and the second identification number at a predetermined timing, and the server device includes a second comparison unit that compares a combination of the first identification number and the second identification number that are currently stored, with a combination of the first identification number and the second identification number that were previously stored.

According to the fourth aspect of the invention, the combination of the first identification number assigned to the power supply device and the second identification number assigned to the peripheral device can be compared, so that unexpected use of the power supply device used for secondary use can be prevented.

DETAILED DESCRIPTION OF THE INVENTION

Hereinafter, embodiments of a power supply device management system of the present invention will be described with reference to the drawings.

Figure 1:
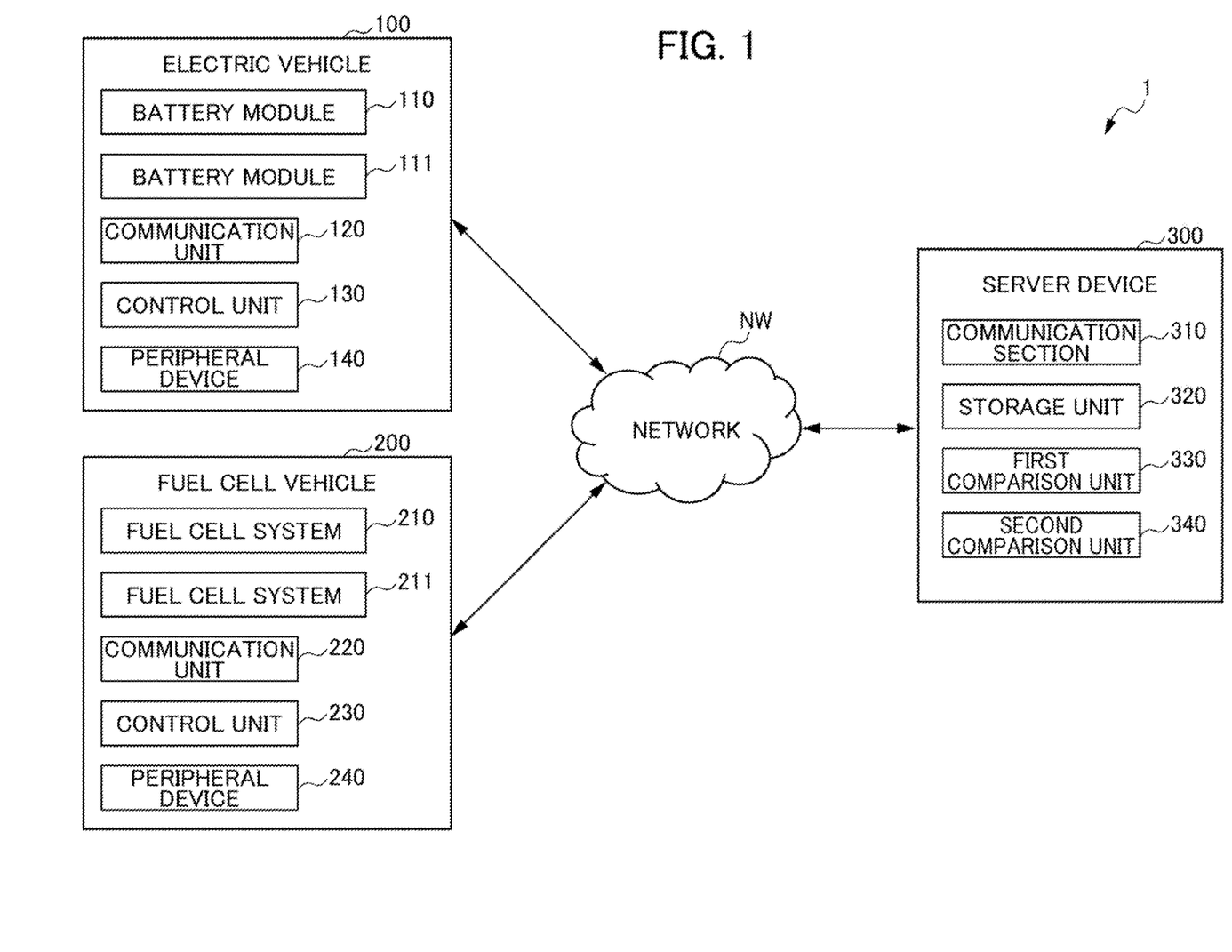
FIG. 1 is a diagram illustrating a functional configuration of a power supply device management system according to the present exemplary embodiment.
Figure 2:
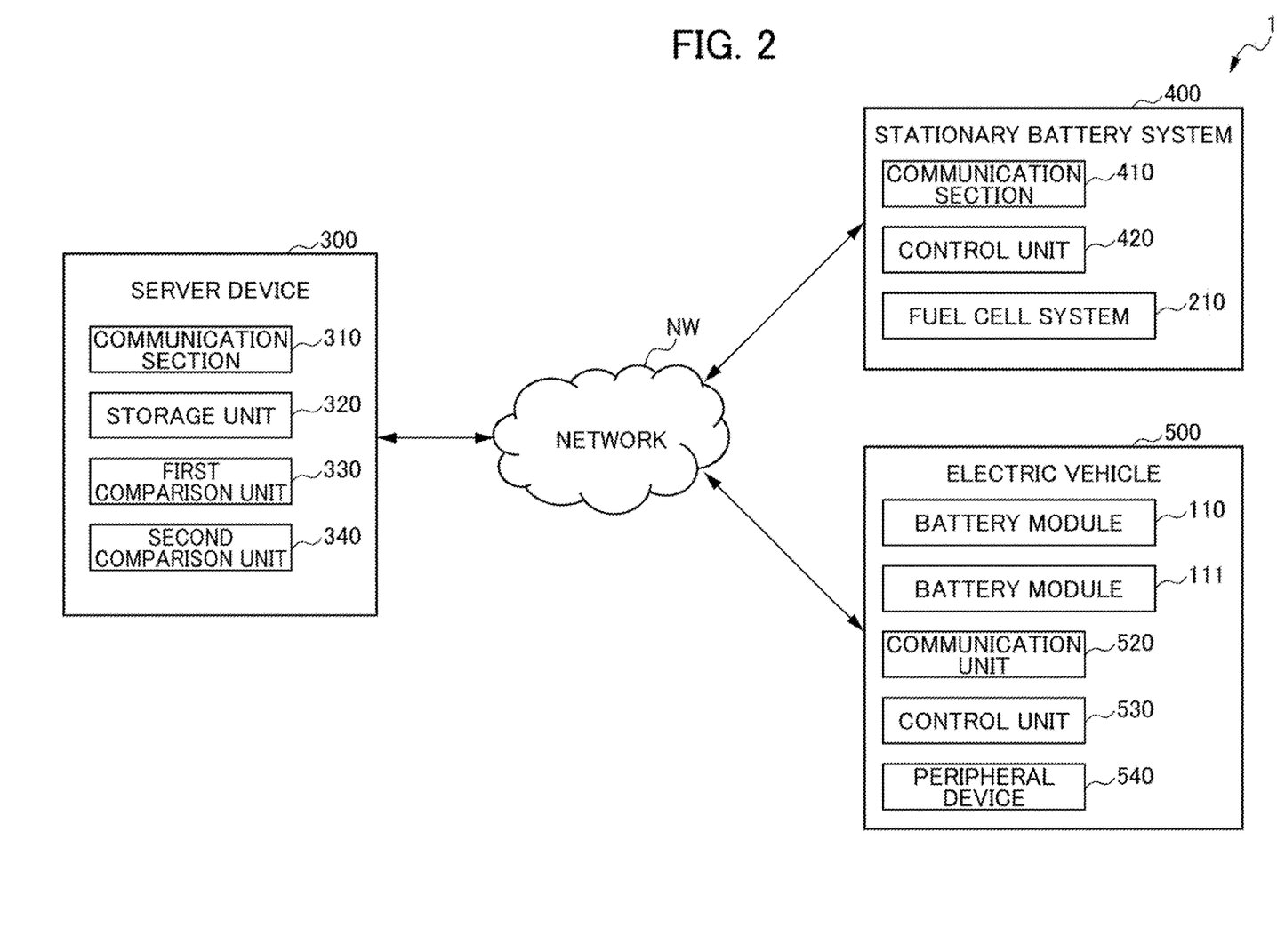
FIG. 2 is a diagram illustrating a functional configuration of a power supply device management system according to the present exemplary embodiment.

FIGS. 1 and 2 are diagrams each illustrating an example of the functional configuration of a power supply device management system 1 according to the present embodiment. The power supply device management system 1 includes an electric vehicle 100 as an electric moving body, a fuel cell vehicle 200 as an electric moving body, a server device 300, a stationary battery system 400, and an electric vehicle 500, as shown in FIGS. 1 and 2.

FIG. 1 is a diagram illustrating a configuration before battery modules 110 and 111 as power supply devices included in the electric vehicle 100, and fuel cell systems 210 and 211 included in the fuel cell vehicle 200 are used for secondary use.

The electric vehicle 100, the fuel cell vehicle 200, and the server device 300 can communicate with each other via a network NW.

FIG. 2 is a diagram illustrating a configuration when the battery modules 110 and 111 included in the electric vehicle 100, and the fuel cell system 210 included in the fuel cell vehicle 200 are used for secondary use in a stationary battery system 400 and an electric vehicle 500, respectively.

The stationary battery system 400, the electric vehicle 500, and the server device 300 can communicate with each other via the network NW.

The electric vehicle 100 is, for example, an electric vehicle or a hybrid electric vehicle that travels by electric power.

The electric vehicle 100 includes the battery modules 110 and 111 as power supply devices, a communication unit 120, a control unit 130, and a peripheral device 140.

The battery modules 110 and 111 as power supply devices are modules each consisting of a secondary battery cell such as a lithium-ion battery capable of repeatedly charging and discharging.

The battery modules 110 and 111 each supply power to a traveling drive motor (not shown) mounted on the electric vehicle 100.

Each of the battery modules 110 and 111 is a module unit as a constitutional unit, and a first identification number is assigned to each module unit.

Characteristic information such as cell voltage characteristics, cell capacity characteristics, output characteristics, etc., and failure history of the battery modules 110 and 111 are periodically transmitted to the server device 300 via the communication unit 120.

The communication unit 120 is, for example, an onboard telematics communication unit TCU, and is configured to be able to communicate with the control unit 130.

Furthermore, the communication unit 120 is configured to be able to communicate with the communication section 310 of the server device 300 via the network NW.

The control unit 130 is, for example, an electronic control unit (ECU) for a vehicle, including a battery control ECU for controlling the battery modules 110 and 111, a motor ECU for controlling the traveling drive motor, an engine ECU, and the like.

The control unit 130 can communicate with the communication unit 120, the battery modules 110, 111, etc. through CAN communication or the like.

The control unit 130 transmits characteristic information such as cell voltage characteristics, cell capacity characteristics, and output characteristics, and failure history received from the battery modules 110 and 111 to the communication unit 120.

The peripheral device 140 is one or more devices around the battery modules 110 and 111, including, but not limited to, a power conversion device that controls the power transfer of the battery module, a temperature control device that regulates the temperature of the battery module, and the like.

The fuel cell vehicle 200 travels by way of the power generated by the fuel cell.

The fuel cell vehicle 200 includes fuel cell systems 210 and 211 as power supply devices, a communication unit 220, a control unit 230, and a peripheral device 240.

The fuel cell systems 210 and 211 as power supply devices include a fuel cell module including a plurality of fuel cell cells.

The fuel cell generates electric power by an electrochemical reaction between a fuel gas such as hydrogen and an oxidant gas.

The fuel cell systems 210 and 211 include a fuel gas supply device, an oxidant gas supply device, a control unit, various sensors, and the like, in addition to the fuel cell module.

Each of the fuel cell systems 210 and 211 is a system unit as a constituent unit, and a first identification number is assigned to each system unit.

Since the configurations of the communication unit 220, the control unit 230, and the peripheral device 240 of the fuel cell vehicle 200 are the same as those of the electric vehicle 100, descriptions thereof will be omitted.

The server device 300 includes a communication section 310, a storage unit 320, a first comparison unit 330, and a second comparison unit 340.

These components are realized by hardware such as a CPU and a hard disk, and software such as a program cooperating, for example. Software such as a program is stored in a storage device such as a hard disk, flash memory, or the like, and used.

The communication section 310 communicates with the communication unit 120 and the communication unit 220 via the network NW.

More specifically, the communication section 310 receives the first identification number from the communication unit 120 and the communication unit 220.

Furthermore, the communication section 310 periodically receives characteristic information such as cell voltage characteristics, cell capacity characteristics, and output characteristics, and failure history from the communication unit 120 and the communication unit 220.

The communication section 310 communicates with a communication section 410 and a communication unit 520 described later via the network NW.

More specifically, when the battery modules 110 and 111, and the fuel cell system 210 are used for secondary use, the communication section 310 transmits the first identification number and characteristic information to the communication section 410 and the communication unit 520.

Thereafter, the communication section 310 receives the characteristic information transmitted from the communication section 410 and the communication unit 520 together with the first identification number. Furthermore, the communication section 310 receives the current position information from the communication section 410, and receives the second identification number from the communication unit 520.

The storage unit 320 stores both the first identification number and the second identification number received by the communication section 310, and the characteristic information and the failure history.

The first identification number and the characteristic information are handed over and stored when the battery modules 110 and 111 and the fuel cell system 210 are used for secondary use.

The combination of the first identification number and the second identification number is stored at each predetermined timing.

The predetermined timing is not particularly limited and, for example, may be stored each time an activation switch of the electric vehicle 100 is turned on.

The storage unit 320 periodically stores the characteristic information and the failure history of the battery modules 110 and 111 as a power supply, and the fuel cell system 210. Thus, for example, it is possible to identify whether the output deterioration of the power supply device is temporary or not.

Both the battery module and the fuel cell system have specific cell characteristics, and the reaction surface area decreases due to a temporary oxidation phenomenon of the catalyst, and temporary deterioration may occur.

It is known that the above temporary deterioration is recovered over time or by performing a reduction reaction.

Therefore, it is possible to improve the estimation accuracy of a deteriorated state by storing the periodic characteristic information and the failure history.

The first comparison unit 330 compares the current position information of the battery module 110 and the fuel cell system 210 with registered position information.

The second comparison unit 340 compares the combination of the first identification number and the second identification number stored the previous time with the combination of the first identification number and the second identification number stored this time.

The processing performed by the first comparison unit 330 and the second comparison unit 340 will be described later.

The stationary battery system 400 is a secondary use destination for the fuel cell system 210 used in the fuel cell vehicle 200.

The stationary battery system 400 is fixed at a predetermined location and used, and is a system capable of charging and discharging electric power.

Examples of such a stationary battery system include a PV power generator, a stationary battery system installed in a home possessing an electric vehicle, a stationary battery system installed for load fluctuation suppression of the power system, and the like.

The stationary battery system 400 includes the communication section 410, the control unit 420, and the fuel cell system 210 as a power supply device, as shown in FIG. 2. When the fuel cell system 210 is used for secondary use in the stationary battery system 400, the position information of the stationary battery system 400 is transmitted to the server device 300 as registered position information.

The registered position information is stored in the storage unit 320.

The communication section 410 is configured to be able to communicate with the communication section 310 via the network NW. The communication section 410, for example, can communicate with a navigation unit (not shown), based on the GPS (Global Positioning System) signal received by the navigation unit, and transmits the present position information of the fuel cell system 210 to the communication section 310.

Furthermore, the characteristic information of the fuel cell system 210 is transmitted to the communication section 310 via the communication section 410.

The electric vehicle 500 is a secondary use destination of the battery modules 110 and 111 which are used in the electric vehicle 100 and the output or capacity has decreased.

The electric vehicle 500 is, for example, an electric vehicle or a hybrid electric vehicle that is driven by electric power. Similarly to the electric vehicle 100, the electric vehicle 500 includes a communication unit 520, a control unit 530, and a peripheral device 540.

Similarly to the communication unit 120, the communication unit 520 is, for example, an onboard telematics communication unit (TCU), and is configured to be able to communicate with the control unit 530 and the communication section 310.

The communication unit 520 transmits the second identification number, which will be described later, to the communication section 310.

Similarly to the control unit 130, the control unit 530 is, for example, an onboard electronic control unit (ECU), and includes a battery control ECU or the like for controlling the battery modules 110 and 111.

The control unit 530 transmits the characteristic information such as cell voltage characteristics, cell capacity characteristics, output characteristics, and failure history received from the battery modules 110 and 111 to the communication unit 520.

Similarly to the peripheral device 140, the peripheral device 540 is one or more devices around the battery modules 110 and 111, and for example, a device such as a power conversion device and a temperature control device. A second identification number is assigned to each peripheral device 540.

The second identification number is transmitted to the communication section 310 via the communication unit 520 at a predetermined timing together with the first identification number.

Next, the flow of processing performed by the first comparison unit 330 will be described with reference to FIG. 3.

Figure 3:
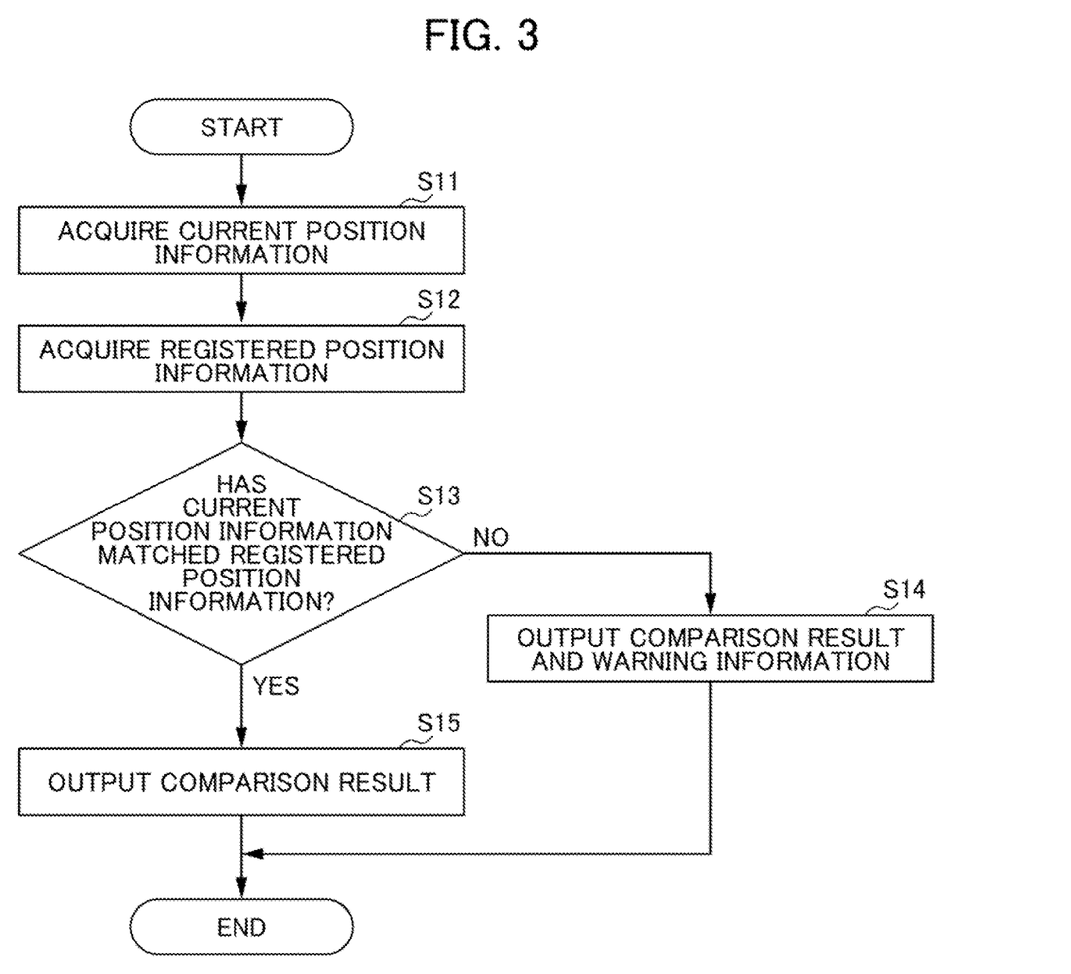
FIG. 3 is a flow diagram illustrating a flow of processing performed by a first comparison unit of the power supply device management system according to the present exemplary embodiment.

As shown in FIG. 3, the processing performed by the first comparison unit 330 includes a current position information acquisition step S11, a registered position information acquisition step S12, a comparison step S13, and output steps S14 and S15.

In the current position information acquisition step S11, the first comparison unit 330 acquires the current position information of the power supply device via the communication section 310.

In the registered position information acquisition step S12, the first comparison unit 330 acquires the registration position information stored in the storage unit 320.

In the comparison step S13, the first comparison unit 330 compares the current position information of the power supply device and the registered position information.

When it is determined that the both do not match, the processing proceeds to the output step S14.

When it is determined that both match, the processing proceeds to the output step S15.

In the output step S14, the first comparison unit 330 outputs a comparison result indicating that the current position information of the power supply device and the registered position information do not match, and outputs warning information.

The outputted comparison result and the warning information may be stored in the storage unit 320, for example, and notified to the administrator of the power supply device management system 1 through the communication section 310.

After the output step S14 is performed, the processing ends.

In the output step S15, the first comparison unit 330 outputs a comparison result indicating that the current position information of the power supply device matches the registered position information. The output comparison result is stored, for example, in the storage unit 320.

After the output step S15 is performed, the processing ends.

According to the first comparison unit 330 performing the above-described processing, it is possible to detect the situation when the current position information of the power supply device and the registered position information do not match.

Therefore, in the case of the power supply device being used illegally or unexpectedly, such use can be detected and a countermeasure can be taken.

Next, the flow of processing performed by the second comparison unit 340 will be described with reference to FIG. 4.

Figure 4:
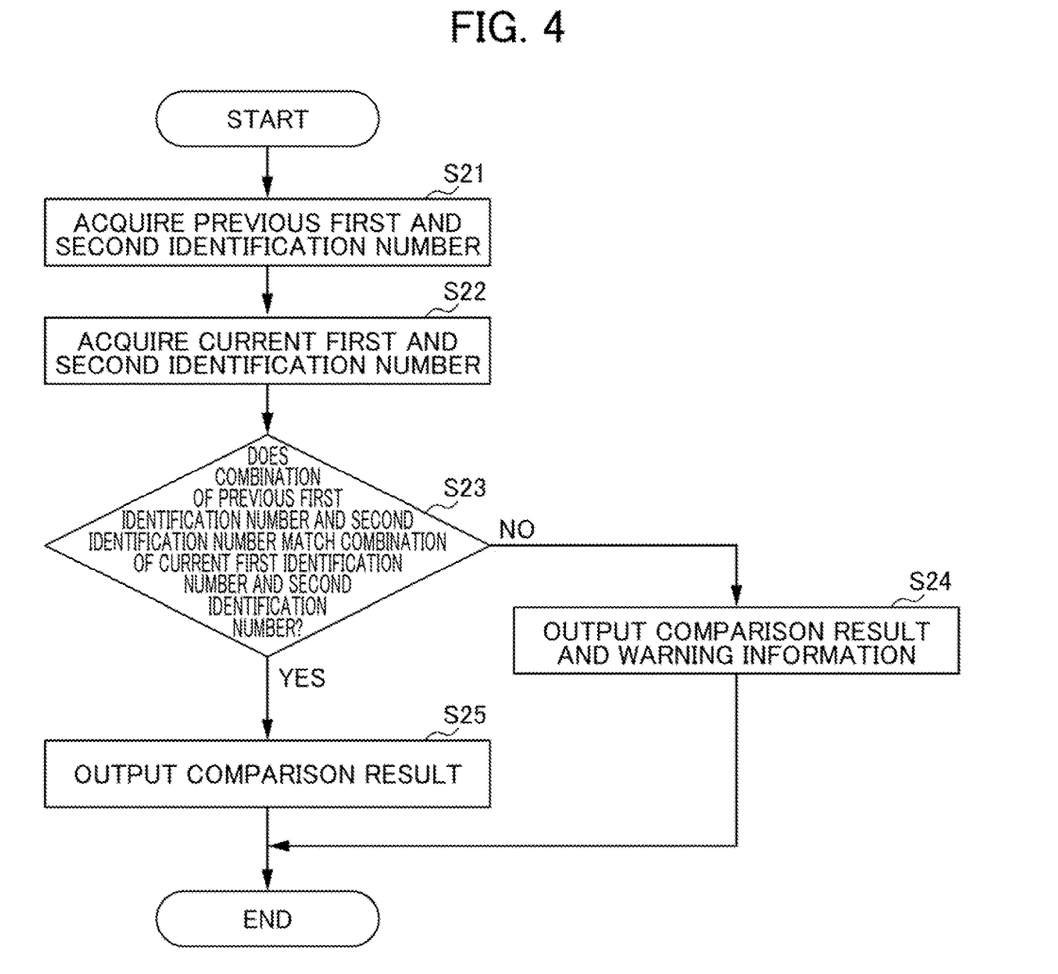
FIG. 4 is a flow diagram illustrating a flow of processing performed by a second comparison unit of the power supply device management system according to the present exemplary embodiment.

As shown in FIG. 4, the processing performed by the second comparison unit 340 includes identification number acquisition steps S21 and S22, a comparison step S23, and output steps S24 and S25.

In the identification number acquisition steps S21 and S22, the second comparison unit 340 acquires the combination of the previous first identification number and the second identification number stored in the storage unit 320, and the combination of the current first identification number and the second identification number.

In the comparison step S23, the second comparison unit 340 performs comparison between the combination of the previous first identification number and the second identification number, and the combination of the current first identification number and the second identification number. When it is determined that the both do not match, the processing advances to the output step S24.

When it is determined that both match, the processing advances to the output step S25.

In the output step S24, the second comparison unit 340 outputs a comparison result indicating that the combination of the previous first identification number and the second identification number does not match the combination of the current first identification number and the second identification number, and outputs warning information. The outputted comparison result and the warning information may be stored in the storage unit 320, for example, and notified to the administrator of the power supply device management system 1 through the communication section 310.

After the output step S24 is performed, the processing ends.

In the output step S25, the second comparison unit 340 outputs a comparison result that the combination of the previous first identification number and the second identification number matches the combination of the current first identification number and the second identification number. The outputted comparison result is stored, for example, in the storage unit 320.

After the output step S25 is performed, the processing ends.

According to the second comparison unit 340 performing the above-described processing, it is possible to detect a situation when the combination of the previous first identification number and the second identification number does not match the combination of the current first identification number and the second identification number. Therefore, when an unexpected use is made such as, for example, a modification of the electric vehicle 500 or reselling of the battery modules 110 and 111, such use can be detected and a countermeasure can be taken.

While preferred embodiments of the present invention have been described above, the present invention is not limited to the above embodiments, and modifications can be appropriately made without departing from the object of the present invention.

EXPLANATION OF REFERENCE NUMERALS

1 power supply device management system
100 electric moving body
110, 111 power supply device
120 communication unit
130 control unit
300 server device
310 communication section
320 storage unit
330 first comparison unit
340 second comparison unit
500 electric vehicle
540 peripheral device

What is claimed is:

1. A power supply device management system comprising:
    an electric moving body including at least one power supply device and a navigation unit, wherein the navigation unit is configured to receive a GPS (Global Positioning System) signal to generate a current position information of the at least one power supply device; and
    a server device, comprising:
        a processor; and
        a memory, wherein the processor is configured to:
            assign a first identification number to each of the power supply devices,
            store, in the memory, registered position information, characteristic information and failure history of the power supply device, together with the first identification number,
            receive the current position information of the at least one power supply device from the electric moving body,
            compare the current position information with the registered position information, and
            output a comparison result of the current position information with the registered position information.

2. The power supply device management system according to claim 1, further comprising an electric vehicle which is a secondary use destination of the power supply device, wherein
    the electric vehicle includes at least one peripheral device to be used together with the power supply device,
    wherein the processor is configured to:
        assign a second identification number to each of the peripheral devices,
        store the first identification number and the second identification number at a predetermined timing,
        compare a combination of the first identification number and the second identification number that are currently stored, with a combination of the first identification number and the second identification number that were previously stored, and
        output a comparison result of the combination of the first identification number and the second identification number that are currently stored, with the combination of the first identification number and the second identification number that were previously stored.

\* \* \* \* \*